W. J. WALKER.

Seed-Separators.

No. 5,227. Reissued Jan. 7, 1873.

Witnesses:
C. W. Bond
C. W. Commons.

William J Walker
by his attorneys
West & Bond

AM. PHOTO-LITHOGRAPHIC CO. N.Y. (OSBORNE'S PROCESS.)

UNITED STATES PATENT OFFICE.

WILLIAM J. WALKER, OF DORSET, ILLINOIS.

IMPROVEMENT IN SEED-SEPARATORS.

Specification forming part of Letters Patent No. 86,332, dated January 26, 1869; reissue No. 5,227, dated January 7, 1873.

*To all whom it may concern:*

Be it known that I, WILLIAM J. WALKER, of Dorset, in the county of De Kalb and State of Illinois, have invented certain new and useful Improvements in Seed-Separators; and I do declare that the following is a full, clear, and exact description of the same, reference being had to the accompanying drawing making a part of this specification, in which—

Figure 1:
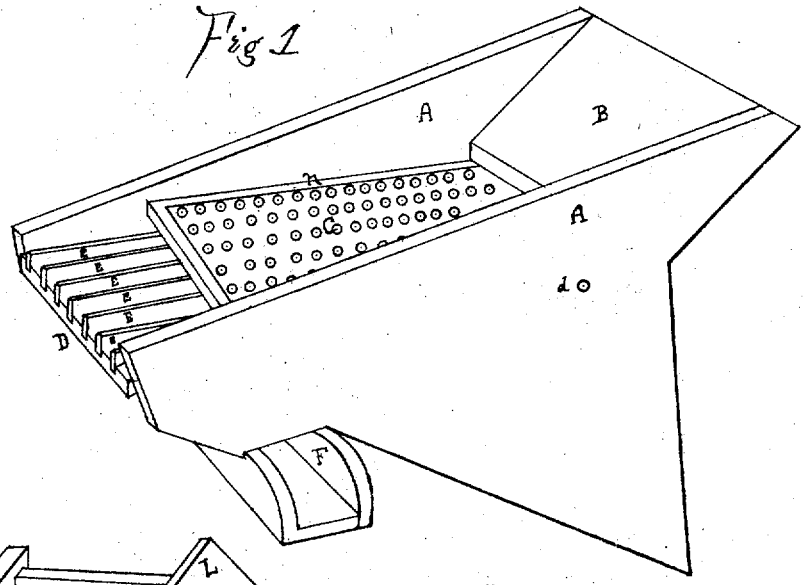
Figure 3:
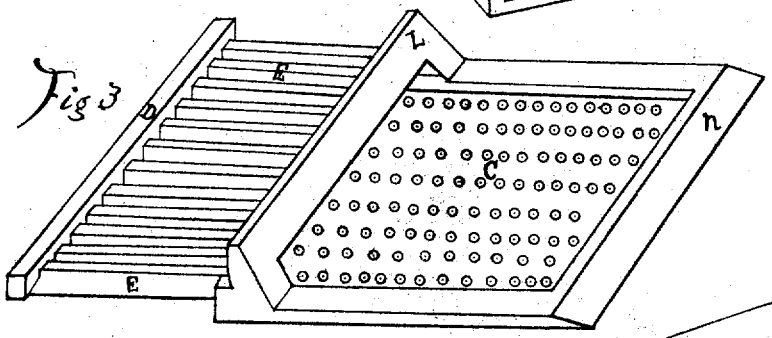
Figure 2:
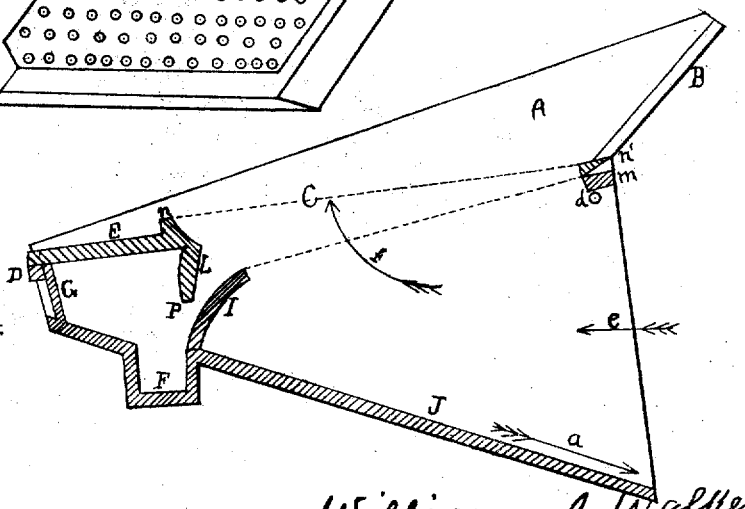

Figure 1 is a perspective representation of the shoe of a separator containing my improvements; Fig. 2, a vertical longitudinal section of the same; and Fig. 3, a representation of the rack and upper sieve removed from the shoe and inverted.

My invention is designed to be chiefly used in that class of separators which are connected with thrashing-machines; and it consists in the construction of a peculiar rack located at the tail of the upper sieve, over which rack the straws and weeds may pass, and through which the tailings fall; in placing a wind-board beneath and at the tail of the upper sieve, so located that there cannot be a current of air passing up through the rack, carrying away seed or grain which ought to go into the tailings' spout; and in the several combinations and devices herein claimed.

In the drawing, A A represent the wooden shoe, now in common use, to support the sieves. C is the upper sieve, which may be made in the usual manner from perforated plate, secured to a frame, *n*, though wire may be used. E is a rack, made of slats or strips, the ends of which are secured to suitable cross-bars. These slats I place far enough apart to allow the tailings to fall through, while larger material will work off over the end. I usually place these slats about three-eighths of an inch apart. The lower end of the frame of the sieve C may be secured to the rack E. This is the most convenient way of supporting the inner end of the rack. The outer end of this rack rests upon the board G, the cross-bar D fitting over it. L is a board, which I call a wind-break, its object being to prevent the air from blowing up through the rack. This board L may be permanently secured to the under side of the sieve C, or it may be secured in place in some other manner. P is an opening between the lower end of the board L and the tail I of the sieve H. The lower sieve H is made in any suitable manner, and it is so arranged in the shoe that its lower end rests upon and fits the upper end of the chute J. The heads *n′ m* of the sieves are placed close together, and they may be supported by pins *d* or otherwise. There should be no space between the chaff-chute B and the sieve C.

The sieves must be adapted to the grain or seed with which they are to be used. The arrows *e f* indicate the direction of the air, and *a* the outgoing seed or grain. F is a trough, into which the tailings pass. The board L performs an important office, preventing the wind from passing up through the rack E, and makes the current through the sieves stronger. Some air will pass down through P, but it cannot reach the rack E with force enough to do any harm. The sieves and rack can be held in place in any suitable manner. The rack E allows the waste material to work off over the end more readily than from a sieve.

My invention is especially adapted to be used in cleaning the lighter seeds, such as grass-seed and clover-seed, which are easily carried away by air-currents; and it is not as essential for grain, though it can be used for that purpose.

What I claim as new is as follows:

1. The wind-board L, located substantially as and for the purpose specified.

2. The rack E in combination with the wind-board L, substantially as and for the purpose specified.

WILLIAM J. WALKER.

Witnesses:
JOHN K. HANNAY,
E. A. WEST.